(No Model.)

A. DOUGHTON.
FILTERING TANK.

No. 320,545. Patented June 23, 1885.

WITNESSES.
R. Newton.
C. E. Beaty.

INVENTOR.
Andrew Doughton.
By F. S. Davenport, Atty.

N. PETERS, Photo-Lithographer, Washington, D. C.

United States Patent Office.

ANDREW DOUGHTON, OF JERSEYVILLE, ILLINOIS.

FILTERING-TANK.

SPECIFICATION forming part of Letters Patent No. 320,545, dated June 23, 1885.

Application filed April 18, 1885. (No model.)

*To all whom it may concern:*

Be it known that I, ANDREW DOUGHTON, of Jerseyville, in the county of Jersey and State of Illinois, have invented a new and Improved Filtering-Tank; and I do hereby declare that the following is a full and exact description of the same, reference being had to the accompanying drawings and to the letters of reference marked thereon.

My invention relates to an improvement in filtering-tanks of that class designed for purifying the water of muddy rivers, creeks, branches, &c., so as to render it fit for the use of farm stock and other purposes for which pure water is required.

The object of my invention is to provide means for collecting a large body of water from a comparatively small stream, and by allowing said body of water to remain for a time undisturbed by the stream from which it is derived, cause it to deposit, by precipitation, the greater part of its impurities, and by a process of filtration in its flow from the main tank to a smaller supplementary one, be liberated from such matter as cannot be deposited by precipitation.

A further object of my invention is to utilize as far as possible, in the warm season, the stream from which the water is derived for the purpose of keeping the contents of the tanks cool.

These objects I accomplish by certain details of construction fully explained in the following specification, and illustrated in the accompanying drawings, in which—

Figure 1:
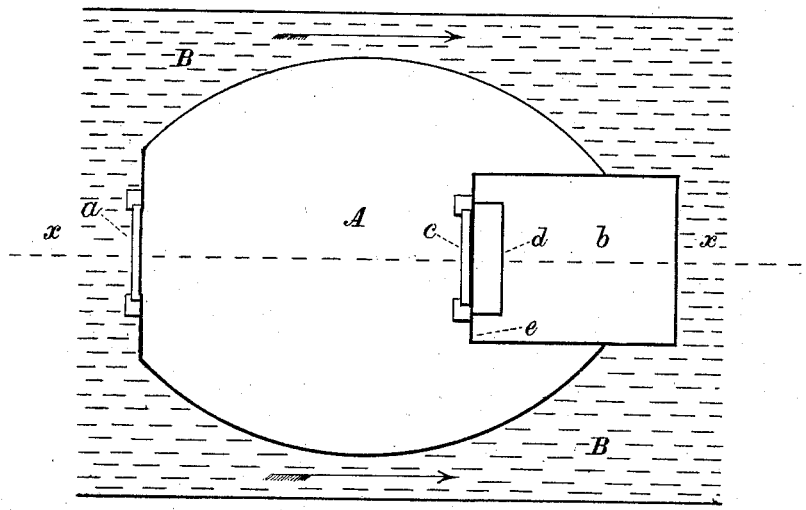
Figure 2:
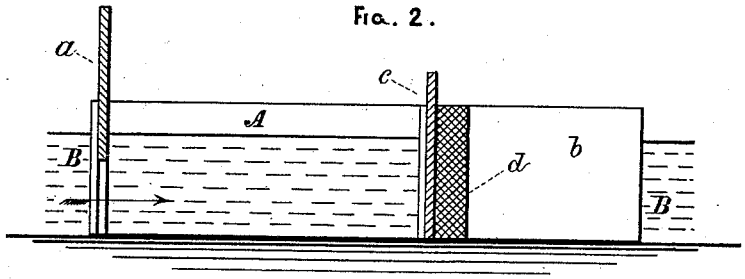

Figure 1 is a plan view of my device, and Fig. 2 is a sectional side elevation of the same taken in the line $x$ $x$, Fig. 1.

In the drawings, A represents a tank of oval form, preferably located in the middle of the stream or creek B, the direction of the current of which is as indicated by the arrows.

The end of the tank opposed to the direction of the current is provided with a sluice or valve, $a$, adapted to slide vertically, the opposite end being provided, as shown, with a supplementary tank, $b$, rectangular in form, and having communication with the main tank A by means of an aperture which may be closed and opened by a sluice or valve, $c$.

Against the inner face of the wall $e$ of the tank $b$ is a box, $d$, made of wire-gauze or other suitable material adapted to be filled with any kind of filtering matter through which the water on its way from the large tank to the small one must pass.

Matters being thus, the operation of my device is as follows: The tank A being firmly embedded in the bottom of the stream and securely fastened down to a suitable foundation, the sluice or valve $c$ is closed and the sluice $a$ opened. The tank A is thus filled by the inflowing water from the stream, after which the sluice $a$ is closed. The body of water contained in the tank A is now allowed to remain undisturbed until the earthy and other matter having a specific gravity greater than water is precipitated, after which the sluice $c$ is opened and the water which has gone through the first process of purification in the large tank A is allowed to flow through the filtering material in the box $d$ into the tank $b$, from which it may be drawn by a pump or other means and be conducted through pipes or by gutters to drinking-troughs placed wherever convenient.

My object in placing the tanks in the middle of the stream is to secure the advantage, in the warm season, of the flow of cool water round them, and hence keep the contents at as low temperature as possible.

In regard to the sediment deposited upon the bottom of the large tank, it is of course removed at convenient intervals when the tank is empty.

Having fully described my invention, what I claim as new, and desire to secure by Letters Patent, is—

The combination, with a tank, A, located in a stream of running water and provided with a sluice, $a$, of the supplementary tank $b$, provided with a sluice, $c$, and filtering-box $d$, both tanks constructed and adapted for co-operative effect, substantially as and for the purpose set forth.

In testimony that I claim the foregoing I have hereunto set my hand this 26th day of January, 1885.

ANDREW DOUGHTON.

Witnesses:
ISAIAH LA RUE,
O. HAMILTON.